United States Patent
Murata et al.

[11] Patent Number: 5,902,876
[45] Date of Patent: *May 11, 1999

[54] POLYBENZIMIDAZOLE COMPOUNDS IN SOLUTION AND A PROCESS FOR THE PREPARATION THEREOF

[75] Inventors: Makoto Murata, Saitama; Toru Nakamura, Tokyo, both of Japan

[73] Assignee: Hoechst Japan Limited, Tokyo, Japan

[ * ] Notice: This patent is subject to a terminal disclaimer.

[21] Appl. No.: 08/877,851

[22] Filed: Jun. 18, 1997

[30] Foreign Application Priority Data

Jul. 5, 1996 [JP] Japan ................................. 8-176889

[51] Int. Cl.$^6$ ............................ C08G 69/00; C08G 73/18
[52] U.S. Cl. ...................... 528/327; 528/125; 528/128; 528/171; 528/183; 528/185; 528/186; 528/188; 528/219; 528/220; 528/228; 528/229; 528/310; 528/331; 528/339.3; 528/341; 528/342; 528/352
[58] Field of Search .................... 528/327, 125, 528/128, 171, 183, 185, 186, 188, 219, 220, 229, 228, 310, 336, 341, 331, 352, 342, 331.3

[56] References Cited

U.S. PATENT DOCUMENTS

| | | | |
|---|---|---|---|
| 3,642,720 | 2/1972 | Kray | 528/327 |
| 4,001,268 | 1/1977 | Kovar et al. | 528/327 |
| 4,431,796 | 2/1984 | Choe et al. | 528/336 |
| 4,452,971 | 6/1984 | Choe et al. | 528/336 |
| 5,104,960 | 4/1992 | Inbasekaran et al. | 528/327 |
| 5,194,562 | 3/1993 | Inbasekaran et al. | 528/327 |
| 5,410,012 | 4/1995 | Connell et al. | 528/327 |

*Primary Examiner*—P. Hampton-Hightower
*Attorney, Agent, or Firm*—Foley & Lardner

[57] ABSTRACT

Improved process for producing a polybenzimidazole compound in solution by dissolving a fully dried polybenzimidazole of the following general formula (1) or (2) in N,N-dimethylacetamide of a sufficiently reduced water content at an elevated temperature of 260° C. or higher in an inert gas atmosphere and a solution of the polybenzimidazole compound produced by the process. The solution remains useful for an extended time without using metal salts or any other stabilizers:

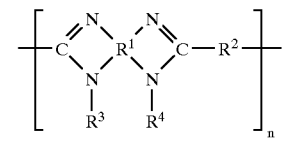

(1)

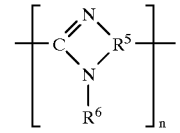

(2)

where $R^1$, $R^2$ and $R^5$ are tetra-, di- and trivalent aromatic groups, respectively; $R^3$, $R^4$ and $R^6$ are each independently a hydrogen atom, an alkyl group or an aryl group; n is an integer of 2 or more.

9 Claims, No Drawings

POLYBENZIMIDAZOLE COMPOUNDS IN SOLUTION AND A PROCESS FOR THE PREPARATION THEREOF

TECHNICAL FIELD

This invention relates to polybenzimidazole compounds in solution that are suitable for use as heat- or chemical-resistant coating or film forming materials which are to be applied to various industrial products, as well as a process for producing such compounds in solution.

BACKGROUND ART

Heat- and chemical-resistant resins typified by polybenzimidazole compounds are difficult to dissolve into solution and it is a common practice to mold the resins after being melted at elevated temperatures but this has limited the range of the applications with polybenzimidazole. Even if the resins are dissolved into special organic solvents, their solubility becomes low with the lapse of time due to association of polybenzimidazole molecule and other factors and, particularly in case that the concentration of the polybenzimidazole compounds is comparatively high, association of polybenzimidazole easily occurs and, as a matter of fact, the shelf life of the solution is very short, only ranging from several days to one or two weeks. In specialty applications, the shelf life of the solution can be extended by incorporating metal salts and other stabilizers into the solution, however, for most electronic devices, the incorporation of metallic components is not preferred since they will deteriorate the device characteristics significantly. In particular, the characteristics of semiconductor and display devices are greatly affected by metallic impurities and the use of the solutions of polybenzimidazole compounds has been very limited in these applications.

Under the circumstances, it has long been desired to develop polybenzimidazole compounds in solution that have comparatively long shelf lives without using stabilizers such as metal salts.

DISCLOSURE OF INVENTION

The present inventors found that when polybenzimidazole compounds of the general formula (1) or (2) set forth below were dissolved into organic solvents of high polarity such as N,N-dimethylacetamide, N,N-dimethylformamide and N-methyl-2-pyrrolidone at elevated temperatures, preferably at least 100° C. higher than the boiling points of these solvents at atmospheric pressure, in the presence of very small amounts of oxygen and water, solutions of comparatively long shelf lives could be obtained without adding metal salts or any other stabilizers:

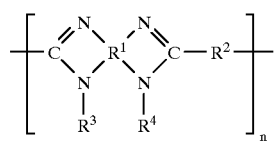
(1)

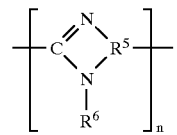
(2)

where $R^1$, $R^2$ and $R^5$ are tetra-, di- and trivalent aromatic groups, respectively; $R^3$, $R^4$ and $R^6$ are each independently a hydrogen atom, an alkyl group or an aryl group; n is an integer of 2 or more.

It was also found that solutions of polybenzimidazole compounds having particularly long shelf lives could be obtained when N,N-dimethylacetamide was used as a solvent. This effect was pronounced when the polybenzimidazole compounds had high molecular weights or when they were dissolved at high concentration. Table 1 compares the shelf lives of four samples of a polybenzimidazole compound of the formula (3) set forth below which had an inherent viscosity of 0.9 and which was dissolved in different solvents at a concentration of 10 wt %. The term "shelf life" as used herein means the period of time over which there occurs no resin precipitation and for which the viscosity of the polybenzimidazole solution will not increase by more than 10% of the initial value as found when the solution was prepared.

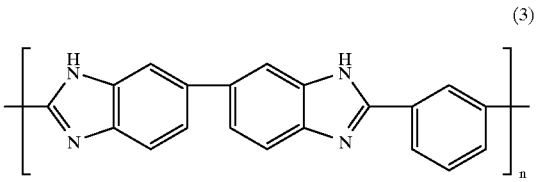
(3)

TABLE 1

| Organic Solvent | Shelf Life |
|---|---|
| N,N-dimethylformamide | 2 days |
| Dimethyl sulfoxide | 2–3 hours |
| N-Methyl-2-pyrrolidone | 1 day |
| N,N-Dimethylacetamide | >1 month |

The present invention has been accomplished on the basis of the findings described above and according to one aspect, it provides a process for producing a polybenzimidazole compound in solution by dissolving a fully dried polybenzimidazole of the general formula (1) or (2) in N,N-dimethylacetamide of a sufficiently reduced water content at an elevated temperature of 260° C. or higher in an inert gas atmosphere.

According to another aspect, the present invention provides a polybenzimidazole compound in solution that is produced by dissolving a fully dried polybenzimidazole of the general formula (1) or (2) in N,N-dimethylacetamide of a sufficiently reduced water content at an elevated temperature of 260° C. or higher in an inert gas atmosphere.

In the general formulae (1) and (2), $R^1$, $R^2$ and $R^5$ represent tetra-, di- and trivalent aromatic groups, respectively. These aromatic groups are selected from among benzene, naphthalene, biphenyl, anthracene, phenanthrene, etc., with benzene and biphenyl being particularly preferred In the general formulae (1) and (2), $R^3$, $R^4$ and $R^6$ each represent a hydrogen atom, an alkyl group or an aryl group.

The alkyl group is preferably selected from among lower alkyl groups having 1–4 carbon atoms, such as methyl, ethyl, n- or i-propyl, n-butyl and t-butyl groups. The aryl group is preferably a phenyl or naphthyl group. The alkyl or aryl group which are represented by $R^3$, $R^4$ and $R^6$ may optionally be substituted by a halogen atom such as fluorine, an amino group, or a lower alkyl group such as a methyl or ethyl group. An example of the preferred polybenzimidazole compound is one that is represented by the formula (3).

BEST MODE FOR CARRYING OUT THE INVENTION

The N,N-dimethylacetamide to be used in the present invention must be sufficiently low in water content and most preferably it should have a water content of 0.03 wt % or less as determined by Karl Fischer titration. The presence of water will contribute to lower the solubility of polybenzimidazole compounds and cause hydrolysis of N,N-dimethylacetamide during the step of dissolving the polybenzimidazole compounds. If N,N-dimethylacetamide is hydrolyzed, alkyl-amines of strong malodor will occur to deteriorate the working environment in which the solutions of polybenzimidazole compounds are applied. N,N-dimethylacetamide of a sufficiently low water content is available as a commercial non-aqueous grade and, if necessary, desiccants such as $P_2O_5$ and Na may be employed.

The polybenzimidazole compounds to be used in the present invention must also be fully dried. Polybenzimidazole compounds generally have such a high propensity to absorb water that great care must be exercised in handling the dried polybenzimidazole compounds until they have been processed into solution. The following is a typical procedure for preparing polybenzimidazole compounds that have been dried to such a state that they are suitable for use in the invention; however, similar procedures may of course be employed depending on the situation.

Procedure for drying polybenzimidazole compounds:

a. vacuum drying the compounds at 5 mmHg for at least 5 h at 70° C.;

b. cooling the vacuum dried compounds to room temperature, recovering them from the vacuum drying machine and within 10 min, transferring them into a reaction vessel for processing into solution.

The solubility of the polybenzimidazole compounds is markedly reduced if oxygen is present during the dissolving step and, hence, an inert gas atmosphere is also essential for the purposes of the invention. Nitrogen and argon are two examples of the most preferred inert gas. After a polybenzimidazole compound has been dispersed in N,N-dimethylacetamide in a reactor, the oxygen level in the reactor has to be fully reduced by, for example, bubbling the dispersion with high-purity nitrogen gas of small water content for 30 min.

Polybenzimidazole compounds of low molecular weights are fairly easy process into solution and the dissolving method of the invention is not necessary be practiced. However, in coating and film applications, the polybenzimidazole compounds desirably have high molecular weights from such viewpoints as strength and modulus of elasticity and the invention will prove the most effective if the polybenzimidazole compounds have molecular weights of at least 0.9 dl/g, preferably 0.9–1.3 dl/g, in terms of an inherent viscosity as determined in conc. sulfuric acid (0.4 g/dl).

The process of the invention may not be practiced, either, if the concentration of the polybenzimidazole compounds is extremely low. In practical applications, concentrated solutions of polybenzimidazole compounds are often required from a productivity viewpoint and the present invention will prove the most effective if the concentration of the polybenzimidazole compounds is at least 0.1 wt %, preferably 1–20 wt %.

The temperature at which the polybenzimidazole compounds are dissolved is another important factor of the invention and must be determined in consideration of the need to suppress the aforementioned hydrolysis of N,N-dimethylacetylamide while ensuring that the filtration for removing insoluble stuff from the solution product can be performed easily. Generally, elevated temperatures at least 100° C. higher than the boiling point of N,N-dimethylacetamide at atmospheric pressure are necessary and in the case of a polybenzimidazole compound of the formula (3) which has an inherent viscosity of 1.0, 280° C. is a preferred dissolving temperature.

The solutions of polybenzimidazole compounds thus produced by the process of the invention are suitable for application to the surfaces of substrates such as metals and glass by various coating techniques such as dipping and spraying so as to form coatings of polybenzimidazole compounds that are capable of establishing good electrical insulation while providing improved chemical resistance. Alternatively, the solutions of polybenzimidazole compounds may be manufactured by method of cast or otherwise applied to form films that are useful as protective films on various types of equipment or as functional films in electrical devices, for examples, proton-conductive films in fuel cells. Other potential applications of the polybenzimidazole compounds in solution that have been produced by the invention are such that they are used as the solution of a starting material for the reaction to prepare the solution of a chemically modified polybenzimidazole compound, and that said polybenzimidazole compounds in solution are mixed with various fillers and other additives with a view to providing functionally improved coatings or films of polybenzimidazole compounds.

EXAMPLES

The following example is provided for the purpose of further illustrating the invention but is in no way to be taken as limiting.

Example 1

Preparing solutions:

Polybenzimidazole of the structure represented by the formula (3) which had an inherent viscosity of 1.0 and which was available from Hoechst Celanese Corp. was placed in a vacuum drying oven which was set at 70° C. and evacuated to 3 mmHg by means of a rotary pump to dry the polymer for 5 h. The dried polybenzimidazole was cooled to room temperature, recovered from the vacuum drying oven and transferred into a 20-L reaction vessel, which was immediately closed. The polybenzimidazole as dried weighed 1 kg.

Nine kilograms of N,N-dimethylacetamide (water content=0.03 wt %) available from DAICEL CHEMICAL INDUSTRIES, LTD. was charged into the same reactor through an inlet, which was then closed.

Nitrogen gas with a purity of at least 99.999% and having a water content of less than 5 ppm was introduced into the reactor at a flow rate of 1 L/min and the reaction solution was bubbled for 30 min at room temperature and for another 30 min at 60° C. under agitation at a rotating speed of 500 rpm.

After the end of the bubbling, both the gas inlet and outlet were closed and the reaction solution was heated up to 280° C. at a rate of 2° C./min and held at 280° C. for 3 h. In the meantime, the pressure within the reactor was kept at 11 kg/cm²G. After the temperature of the reaction solution had dropped to room temperature, the completely dissolved polybenzimidazole was recovered from the reactor. Two additional solutions of polybenzimidazole of the formula (3) were prepared by repeating the above procedure, except that the N,N-dimethylacetamide with a water content of 0.03 wt % was replaced by other grades of N,N-dimethylacetamide which had water contents of 0.01 wt % and 0.02 wt %, both being available from DAICEL CHEMICAL INDUSTRIES, LTD.

Characteristics of the Solutions:

The three samples were red brown and highly clear solutions of polybenzimidazole, which each had a viscosity of 300 cps. They smelled only N,N-dimethylacetamide but there was no ammoniacal odor due to alkylamines. They were stored at room temperature for 3 months without any change in clarity and viscosity.

Comparative Example 1

The procedure of Example 1 was repeated, except that the water content of N,N-dimethylacetamide in which the polybenzimidazole of the formula (3) was to be dissolved was changed to 1.0, 0.1 and 0.05 wt %. The respective samples of solution had the characteristics shown in Table 2, which also showed the data on the samples prepared in Example 1.

TABLE 2

| Water content, wt % | Solution Characteristics | |
|---|---|---|
| | Solubility | Alkylamine odor |
| 1.0 | Δ | — |
| 0.1 | ○ | x |
| 0.05 | ○ | x |
| 0.03 (Ex. 1) | ○ | ○ |
| 0.02 (Ex. 1) | ○ | ○ |
| 0.01 (Ex. 1) | ○ | ○ |

Solubility:
Δ, poor; ○, good
Alkylamine odor:
x, strong; ○, absent (when checked by the human olfactory sense after the solution was stirred)

Comparative Example 2

The procedure of Example 1 was repeated, except that the maximum temperature for dissolving the polybenzimidazole of the formula (3) in N,N-dimethylacetamide was changed to 220, 240 and 260° C. The respective samples of solution had the characteristics shown in Table 3.

TABLE 3

| Maximum Dissolving Temperature, °C. | Solubility Characteristics |
|---|---|
| 220 | Resin undissolved |
| 240 | Much gel like undissolved stuff |
| 260 | Good |
| 280 (Ex. 1) | Good |

The above data of Example 1 and Comparative Examples 1 and 2 demonstrate that polybenzimidazole compounds could be dissolved only in organic solvents of low water content with little formation of alkylamines that would be toxic and objectionable odor to the human body. In addition satisfactory solutions having no part, or enough less part to remove easily with filtration technique, of the resin left undissolved or forming gels were produced when the temperature for the dissolving reaction was preferably at least 100° C. higher than the boiling points of the solvents at atmospheric pressure.

Industrial Applicability

As described on the foregoing pages, the present invention enables the supply of polybenzimidazole compounds in solution having an extended shelf life without using metal salts or any other stabilizers, thereby realizing polybenzimidazole compounds in solution that can be applied to various industrial products as heat- or chemical-resistant coating or film forming materials.

What is claimed is:

1. A process for producing a polybenzimidazole compound in solution by dissolving a fully dried polybenzimidazole of the following general formula (1) or (2) in N,N-dimethylacetamide of a sufficiently reduced water content at an elevated temperature of 260° C. or higher under an atmosphere of inert gas:

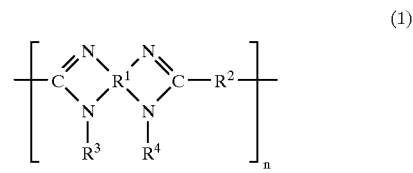

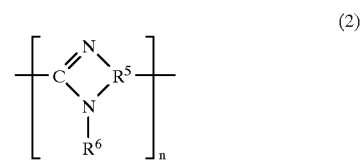

where $R^1$, $R^2$ and $R^5$ are tetra-, di- and trivalent aromatic groups, respectively; $R^3$, $R^4$ and $R^6$ are each independently a hydrogen atom, an alkyl group or an aryl group; n is an integer of 2 or more.

2. A process according to claim 1, wherein the polybenzimidazole compound Is represented by the following formula (3):

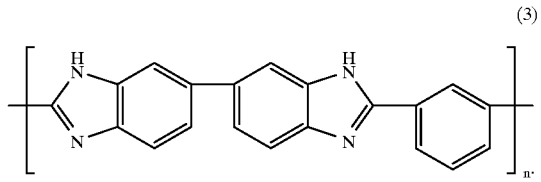

3. A process according to claim 1, wherein the water content of said N,N-dimethylacetamide is 0.03% by weight or less.

4. A process according to claim 2, wherein the water content of said N,N-dimethylacetamide is 0.03% by weight or less.

5. A polybenzimidazole compound in solution produced by the process of claim 1.

6. A polybenzimidazole compound in solution according to claim 5, wherein the polybenzimidazole compound is represented by the following formula (3):

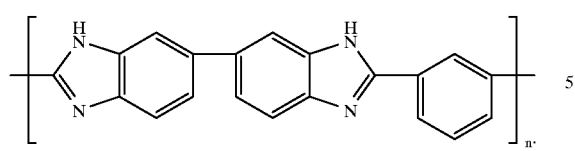

(3)

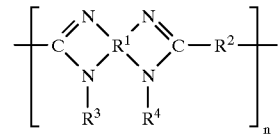

(1)

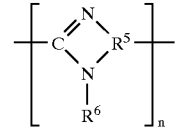

(2)

7. A polybenzimidazole compound in solution according to claim 5, wherein the water content of said N,N-dimethylacetamide is 0.03% by weight or less.

8. A polybenzimidazole compound in solution according to claim 6, wherein the water content of said N,N-dimethylacetamide is 0.03% by weight or less.

9. A process for producing a polybenzimidazole compound in solution by dissolving a fully dried polybenzimidazole of the following general formula (1) or (2) in N,N-dimethylacetamide of a sufficiently reduced water content at an elevated temperature of 260° C. or higher under an atmosphere of inert gas in the absence of metal salt:

where $R^1$, $R^2$ and $R^5$ are tetra-, di- and trivalent aromatic groups, respectively; $R^3$, $R^4$ and $R^6$ are each independently a hydrogen atom, an alkyl group or an aryl group; n is an integer of 2 or more.

* * * * *